United States Patent [19]

Schaeffer

[11] Patent Number: 4,866,710
[45] Date of Patent: Sep. 12, 1989

[54] REUSE GROUPS FOR SCAN MONITORING IN DIGITAL CELLULAR SYSTEMS

[75] Inventor: Dennis R. Schaeffer, Buffalo Grove, Ill.

[73] Assignee: Motorola, Inc., Schaumburg, Ill.

[21] Appl. No.: 158,960

[22] Filed: Feb. 22, 1988

[51] Int. Cl.[4] .............................................. H04J 3/16
[52] U.S. Cl. ..................................... 370/95.1; 370/50
[58] Field of Search ................. 370/95, 50, 104, 69.1; 455/33

[56] References Cited

U.S. PATENT DOCUMENTS

| | | | |
|---|---|---|---|
| 4,215,244 | 7/1980 | Gutleber | 370/95 |
| 4,268,722 | 5/1981 | Little et al. | 179/2 EB |
| 4,355,411 | 10/1982 | Reudink et al. | 455/33 |
| 4,398,063 | 8/1983 | Hass et al. | 455/33 |
| 4,485,486 | 11/1984 | Webb et al. | 455/33 |
| 4,654,867 | 3/1987 | Labedz et al. | 379/59 |
| 4,696,027 | 9/1987 | Bonta | 379/60 |
| 4,747,101 | 5/1988 | Akaiwa et al. | 370/95 |
| 4,783,780 | 11/1988 | Alexis | 370/95 |
| 4,785,450 | 11/1988 | Bolgiano et al. | 370/95 |
| 4,799,252 | 1/1989 | Eizenhoffer et al. | 455/33 |

FOREIGN PATENT DOCUMENTS 3009309 3/1981 Fed. Rep. of Germany.

OTHER PUBLICATIONS

"A Digital FD/TDMA System for a New Generation", pp. 41–46 of Primer for the Future... Digital Technology, L. M. Ericsson Telephone Co., Jun., 1987.

Primary Examiner—Douglas W. Olms
Attorney, Agent, or Firm—F. John Motsinger; Rolland R. Hackbart; Anthony J. Sarli

[57] ABSTRACT

An improved TDMA radiotelephone cellular communication system employs an improved cell site scan monitoring technique. The technique includes monitoring radiotelephone calls, and tracking and recording their signal qualities. The records are used to maintain and determine which frequencies and which time partitions at the base site equipment are being utilized for radiotelephone communication. When a new call assignment is required at a cell site, it is assigned to a time partition of a base site equipment frequency in a frequency prioritized manner such that radiotelephone calls are concentrated within each frequency so as to reduce the number of frequencies carrying radiotelephone calls.

21 Claims, 6 Drawing Sheets

REUSE GROUPS FOR SCAN MONITORING IN DIGITAL CELLULAR SYSTEMS

FIELD OF THE INVENTION

The present invention relates generally to radio communication systems, and, more particularly, to digital cellular communication systems and a technique for improving the channel usage efficiency in such systems during the process of assigning channels and performing "handoffs", i.e., transferring a radiotelephone call from a voice channel within one coverage area to a voice channel within an adjacent coverage area.

BACKGROUND

In conventional analog cellular communication systems, a plurality of base sites are used to provide associated geographical coverage areas within which radiotelephones communicate. Each base site is controlled by the system's central switch controller. When a radiotelephone call is to be handed-off from a communication channel at the host base site (the base site currently sustaining the call) to a communication channel at an adjacent base site, the system must determine which adjacent base site provides the best coverage area for the handoff. This is typically accomplished by instructing the equipment at each adjacent base site to monitor the channel used by the radiotelephone to be handed-off. Using scan receivers to monitor the radiotelephone channels, the equipment at each adjacent base site reports the signal strength of the radiotelephone's signal to the system's switch controller. The switch controller then compares the strongest reported signal strength with the signal strength from the radiotelephone at the host base site. When the latter falls below that of the former, the radiotelephone is instructed to reconfigure its transceiver to effect the handoff.

In a time division multiplex access (TDMA) cellular communication system, there are typically a plurality of radio frequencies employed at each base site to provide the appropriate allocation of voice communication channels for the base site's associated coverage area. Each frequency is time partitioned into several time slots, each of which may carry radiotelephone communication.

When a radiotelephone call is to be handed-off between coverage areas in a TDMA cellular communication system, the system also determines to which base site the call should be handed-off by the adjacent base sites monitoring the channel used by the radiotelephone. However, because each frequency may be carrying a radiotelephone communication, the base sites' scan receivers can become excessively busy monitoring each time slot in each frequency for each radiotelephone's signal strength.

This problem is aggravated when each base site includes only a few scan receivers which are time shared to monitor the frequencies. For each frequency on which at least one radiotelephone is a handoff candidate, the scan receiver must adjust its oscillator to that frequency and receive the information transmitted thereon. Such oscillator adjustment introduces a significant delay which is inherent in most every receiver. As the number of potential handoff candidates increases, this inherent delay can become unacceptable.

Accordingly, a scan receiver monitoring technique for such base sites in a TDMA cellular communication system is needed which overcomes the above described deficiencies.

OBJECTS OF THE PRESENT INVENTION

It is a general object of the present invention to provide a TDMA cellular communication system which overcomes the above described shortcomings.

It is a more particular object of the present invention to provide a cellular communication system which increases the usage efficiency of scan receivers in such systems by assigning radiotelephone calls to time partitions of the cell sites in a frequency prioritized manner such that radiotelephone calls are concentrated within each frequency so as to reduce the number of frequencies carrying radiotelephone calls.

An additional object of the present invention includes increasing the usage efficiency of scan receivers in a radiotelephone frequency hopping TDMA cellular system by assigning radiotelephone calls to time partitions of the cell sites's frequencies in a frequency prioritized manner and by measuring radiotelephone call signals by the scan receiver in a delayed manner such that the amount of frequency programming to each scan receiver is minimized.

BRIEF DESCRIPTION OF THE DRAWINGS

The features of the present invention which are believed to be novel are set forth with particularity in the appended claims. The invention, together with further objects and advantages thereof, may best be understood by making reference to the following description taken together with the accompanying drawings, in which reference numerals identify the elements, and wherein:

DETAILED DESCRIPTION OF THE PREFERRED EMBODIMENT

The arrangement disclosed in this specification has particular use for handing-off radiotelephone calls between cells in a TDMA cellular telephone infrastructure. More particularly, the arrangement disclosed herein is directed to improving the usage efficiency of scan receivers with respect to channel assignments in such systems for call initiations and handoffs.

Figure 1A:
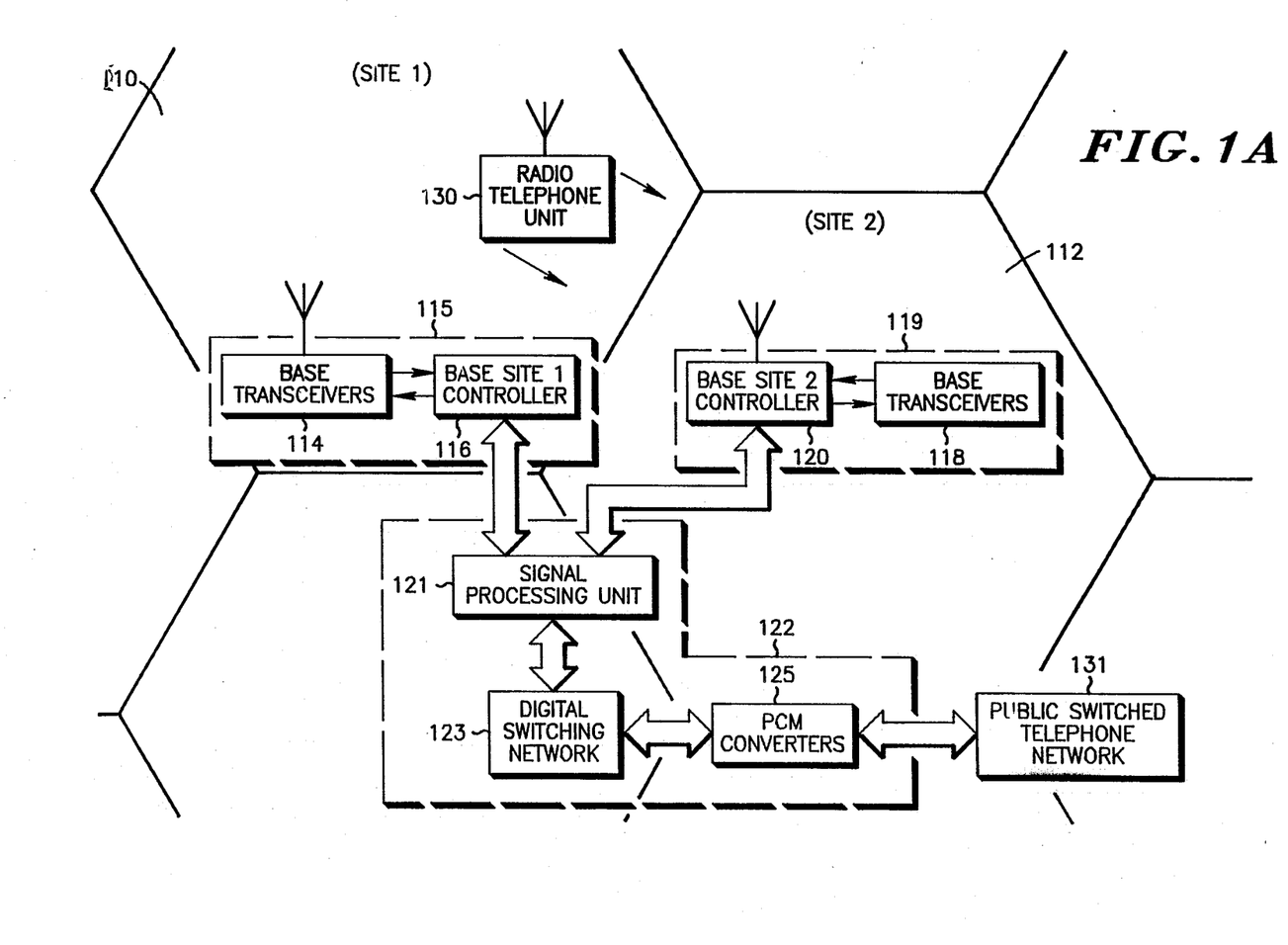
FIG. 1a is a diagram of a cellular communication system including two base sites and their respective equipment, according to the present invention.

FIG. 1a illustrates a novel cellular system which includes base site equipment 115 and 119 for two geographic radio frequency (RF) coverage areas (cells) 110 and 112, respectively. For cell 110, the base site equipment 115 includes a set of base transceivers 114 and a base site (1) controller 116. For cell 112, the base site equipment 119 includes a set of base transceivers 118 and a base site (2) controller 120 with substantially identical circuitry as the base site equipment 115.

For purposes of exemplifying a handoff operation according to the present invention, a radiotelephone unit 130 is depicted in transition from cell 110 to cell 112.

Overall control of the base site equipment 115 and 119 is provided by a signal processing unit 121 of a cellular switch controller 122. The switch controller 122 also includes a digital switching network 123 for controlling the call switching operation between a public switched telephone network (PSTN) 131 and the base site equipment 115 and 119. A set of pulse code modulation (PCM) converters 125 are included in the cellular switch controller 122 for interfacing the system to the PSTN 131. For general details of a conventional cellular system, reference may be made to "Cellular Voice and Data Radiotelephone System", Labedz et al., U.S. Pat. No. 4,654,867. For further details of a conventional cellular switch controller, reference may be made to U.S. Pat. No. 4,268,722, Little et al. Both of the above U.S. patents are assigned to the same assignee and incorporated herein by reference.

Figure 1B:
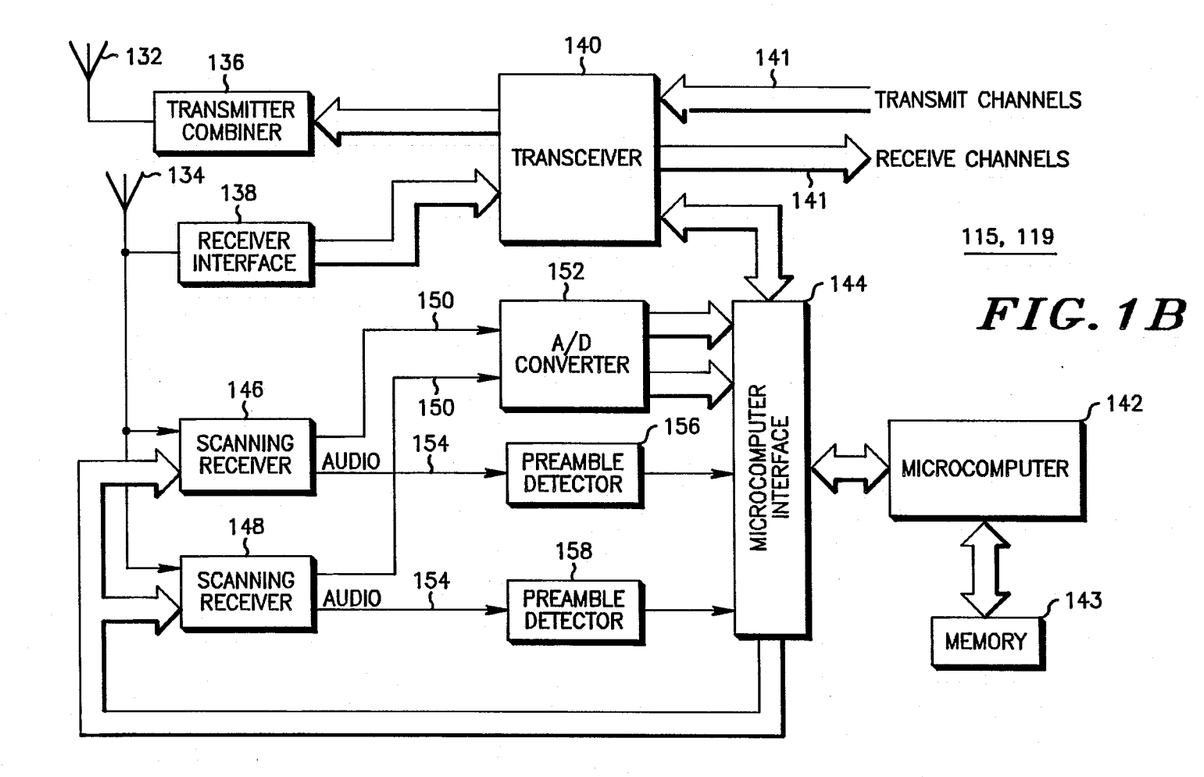
FIG. 1b is an expanded diagram of the base site equipment 115 or 119 of FIG. 1a, according to the present invention.

In FIG. 1b, the base site equipment 115 or 119 is shown in expanded form. The radio portion of the base site equipment is conventional. It includes a set of transmit antennas 132, a set of receive antennas 134, a transmitter- combiner 136, a receiver interface equipment 138, a transceiver 140 and audio paths 141 directed to/from the switch controller 122 of FIG. 1a. Transceiver functions such as frequency programming, transmit keying, transmit power control, alarm and status monitoring, and message passing are controlled by a microcomputer 142 through a microcomputer interface 144. A conventional scan receiver 146 or 148 monitors the signal strength of radiotelephone transmissions in adjacent cells and provides an output 150 which is used by the microcomputer 142 to determine when radiotelephones in such adjacent cells are handoff candidates. Measuring radiotelephone signal strength with scan receivers is typical in most analog cellular systems. For example, in U.S. Pat. No. 4,696,027, Bonta et al., a scan receiver implementation for such a system is described. For further details of conventional base site equipment, reference may be made to U.S. Pat. No. 4,485,486. Both of the above referenced U.S. patents are assigned to the same assignee and incorporated herein by reference.

According to the present invention, the microcomputer 142 also controls the scan receivers 146 and 148. The particular method of control, which is unique to the present invention, is discussed in more detail with Figs. 2, 3 and 4. An analog to digital converter (ADC) 152 is used to convert the outputs 150 provided by the scan receivers 146 and 148 to digital form for analysis by the microcomputer 142.

Each scan receiver 146 or 148 generates an additional (audio) output 154 which is used by a preamble detector 156 or 158 to detect the beginning of a radiotelephone transmission. In a TDMA cellular communication system, the radiotelephones are typically synchronized with the base site equipment at each of the cell sites. A radiotelephone transmits and receives messages by accessing a timeslot of a particular frequency, as assigned by the base site equipment. Each message, received or transmitted, begins with a preamble consisting of a predetermined signal pattern. For more detail, reference may be made to "A Digital FD/TDMA System for a New Generation", pages 41–46 of "Primer for the Future ... DIGITAL TECHNOLOGY", L. M. Ericsson Telephone Company, June, 1987. The preamble detector 156 or 158 may implemented using a conventional multi-bit digital comparator circuit.

Accordingly, the preamble detector 156 or 158 detects the preamble of each radiotelephone message received by the respective scan receiver 146 or 148. After each such detection, the preamble detector 156 or 158 informs the microcomputer 142, via the microcomputer interface 144, so that the microcomputer knows when the signal strength should be measured from the received data at the outputs 150 of the scan receivers. Measurements performed by the microcomputer 142 are stored in a database in a memory circuit 143.

Figure 2:
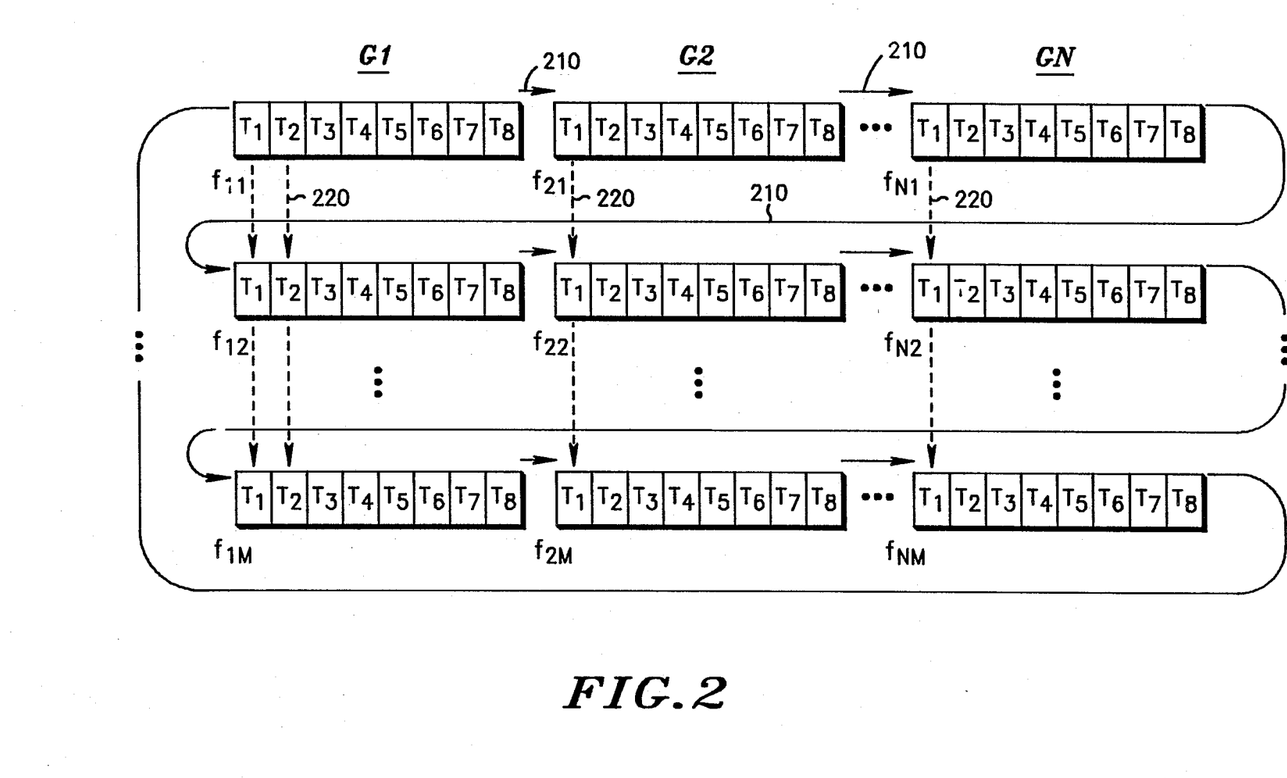
FIG. 2 is diagram illustrating a frequency assignment for the scan receiver 146 or 148 of FIG. 1b, according to the present invention.
Figure 3:
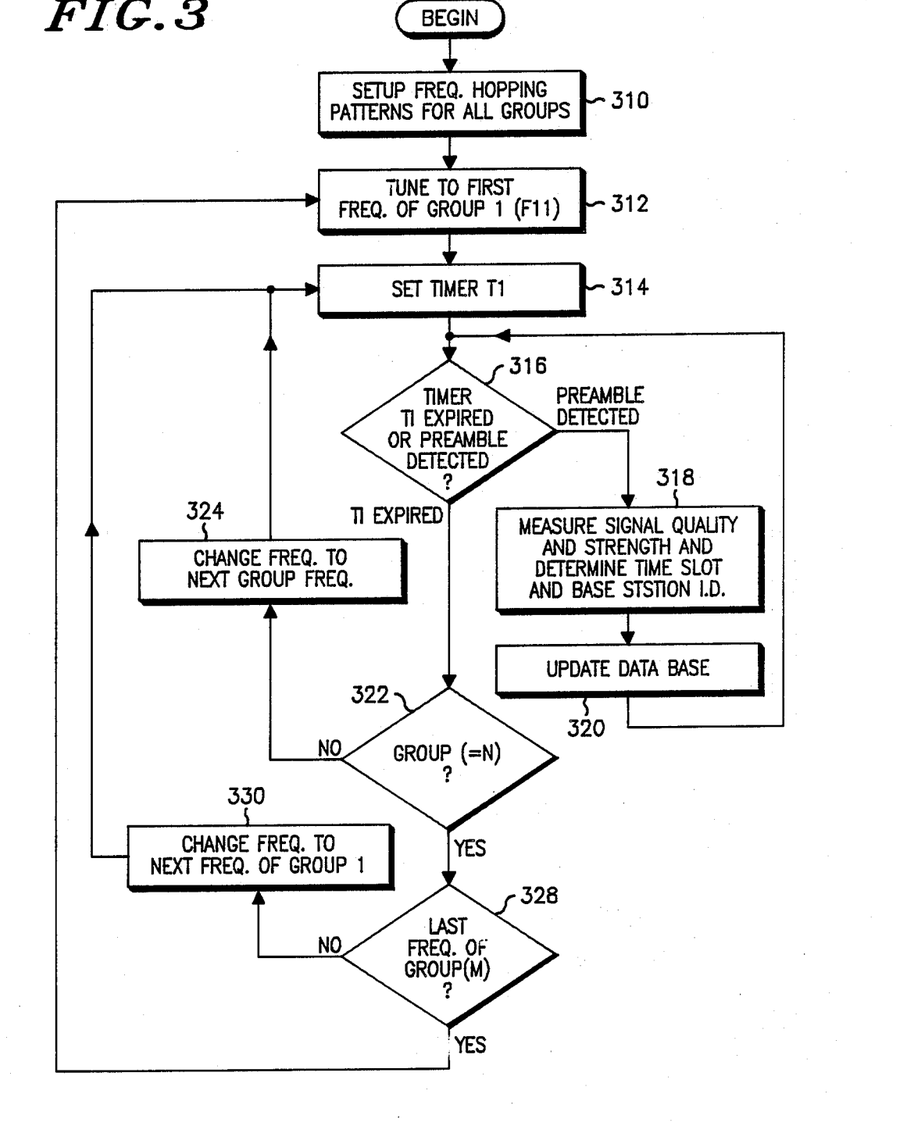
FIG. 3 is a flowchart illustrating a frequency assignment for the scan receiver 146 or 148 of FIG. 1b, according to the present invention.

The microcomputer 142 operation for the scan receiver 146 or 148 is illustrated in FIG. 2 and in the corresponding flowchart of FIG. 3. The illustrations in FIGS. 2 and 3 particularly involve the operation of a TDMA cellular communication system in which radiotelephone frequency hopping is employed, i.e., where radiotelephones communicate on the system in a designated time slot while rotating between a predetermined group of frequencies. Such a system is described in more detail in "A Digital FD/TDMA System for a New Generation", supra.

The flowchart of FIG. 3 begins at block 310 where the microcomputer establishes the frequency hopping patterns and groups for radiotelephone communication within the associated coverage area. FIG. 2 illustrates an example of a system frequency hopping group assignment, according to the present invention, for N groups in which M frequencies per hopping pattern (group) are employed. Each employed frequency includes 8 time slots ($T_1$-$T_8$). In this example, the 8 time slots ($T_1$-$T_8$) establish a set which is equal to 1 frame. There are a total of ($N \times M$) frequencies used. A solid line 210, which rotates through each frequency in each group from left to right and top to bottom is depicted to represent the flow of the scan receiver through each time slot and each frequency. Mathematically, the scan receiver assignment changes from frequency $f_{xy}$ to frequency $f_{x+1,y}$ with X being reinitialized to 1 after the Mth frequency. A series of vertical dotted lines 220, are depicted to illustrate the frequency transition for a hopping radiotelephone in a particular time slot of a group during communication.

From block 310, flow proceeds to block 312 where the frequency of the scan receiver is set to the first frequency of group 1 ($f_{11}$ of FIG. 2).

At block 314, a software timer (internal to the microcomputer 144 of FIG. 1b) is set to begin timing a time interval equal to the time required to receive 1 frame of data. This timer is used to limit the length of time that the scan receiver will remain on any given frequency to receive data in a designated frame.

At block 316, tests are repeatedly performed to determine if either the timer has timed out or if the preestablished preamble has been detected in the received signal. As previously discussed, each radiotelephone transmission is preceded by a predetermined data pattern defining the preamble. However, although a transmission will be expected, there may not be a transmission on every time slot of a given frame.

If the preamble is detected before the timer times out, flow proceeds to block 318. At block 318, because the preamble has been detected, the microcomputer presumes that a valid radiotelephone transmission has been received. The quality of the data following the preamble is tested for signal strength and signal "integrity" (i.e., the data legibility or data bit error ratio) using conventional digital analysis methods. In addition, the microcomputer examines the data to determine the base station's unique identification code (to identify the radiotelephone's site), and determines in which time slot the transmission was made. The particular time slot can be determined from the local base equipment reference timing if the system has synchronized base stations.

If the system does not have synchronized base stations, the time slot can be determined by extracting the time slot information from the received message. e.g., the radiotelephone's unique identification (ID) code can be extracted from the preamble and passed to the microcomputer which can then identify the time slot using a conventional memory look-up technique with the ID code as the address.

From block 318, flow proceeds to block 320 where the microcomputer's data base is updated to indicate the presence of a radiotelephone transmission in the detected time slot, and the measurements for that transmission are stored accordingly. From block 320, flow returns to block 316 so that a transmission in the next time slot can be detected.

If the preamble is not detected before the timer times out, flow proceeds from block 316 to block 322 where a test is performed to determine if the scan receiver has just finished receiving data in the frame of the last group. In FIG. 2, this test is satisfied after the scan receiver receives data from the eighth time slot of the Nth group.

If the scan receiver has not finished receiving data from the frame of the last group, flow proceeds from block 322 to block 324 where the scan receiver is assigned to the frequency of the next group. In FIG. 2, this is a horizontal move along the solid line from the left to the right. From block 324, flow returns to block 314 so that the scan receiver can begin receiving data for a new frame.

If the scan receiver has finished receiving data for the frame of the last group, flow proceeds from block 322 to block 328 where a test is performed to determine if the scan receiver has completed receiving data from the frame of the last group. In FIG. 2, this test would comprise a determination as to whether or not the frequency being monitored is $f_{NM}$. If the scan receiver is not monitoring frequency $f_{NM}$ at this point, flow proceeds to block 330 where the scan receiver is assigned to the next frequency of the first group. If the frequency is equal to $f_{NM}$ at this point, flow returns to block 312 where the entire process is reinitiated from the first frequency of the first group.

As this process continues, the microcomputer's data base, as indicated at block 320, is continuously updated. Because the data base is being updated with measurements of signal quality and strength for any radiotelephone's transmission from an adjacent cell, the switch controller (FIG. 1a) is provided access with an up-to-date status of a radiotelephone's potential to be handed-off to the associated cell site.

This status information can be used in a conventional handoff process such as the ones described in U.S. Pat. Nos. 4,485,486 (Webb et al.), 4,654,867 (Labedz) and 4,696,027 (Bonta et al.), supra. It should be pointed out, however, that because this information is immediately available to the switch controller, the switch controller does not have to request the base site equipment at adjacent cells to first perform the requisite monitoring for each handoff candidate radiotelephone. The switch controller merely queries the adjacent cell site equipment to provide the information already stored in the database. Alternatively, the adjacent cell site equipment can continually provide this accumulated signal information to the switch controller to alleviate the extra step of having the switch controller first make the request. Using either implementation, this provides a significant advantage over known system scan monitoring techniques because it substantially reduces the time otherwise necessary to determine where and when to make a handoff.

Another aspect of the present invention involves the manner in which communication frequencies (channels) are assigned at each of the cell sites. As indicated previously, each time a scan receiver is assigned a new frequency, an inherent delay occurs before the scan receiver can actually receive data on the new frequency. In a frequency hopping TDMA cellular system, a significant amount of data can be missed by a scan receiver if this delay becomes excessive.

To overcome this problem, the present invention employs a novel radiotelephone time slot/frequency assignment. Referring to FIG. 2, this assignment involves selecting an open time slot from a group frame such that the group frames are filled one frame at a time, and that each group is filled before another group is filled.

For example, presume that at a particular time the base site targeted for a handoff includes two designated groups (G1 and G2), and four corresponding frequencies (F11, F12, F21, F22). Further, at a given point in time presume that in the group frame $F_{11}$, radiotelephone calls are active in frames 1, 3, 5, 6, 7 and 8; in the group frame $F_{12}$ radiotelephone calls are active in frames 1, 2 and 3; and in the group frames $F_{21}$ and $F_{22}$, there are no active radiotelephone calls. According to the present invention, the first open time slot in this given frequency assignment (for a radiotelephone candidate or for a radiotelephone call initiation) is the second time slot of the group frame designated $F_{11}$. Thus, the second time slot of the group frame designated $F_{11}$ will be chosen.

The next radiotelephone call assignment at this site will be (presuming the same active calls as described earlier) the fourth time slot of the group frame designated $F_{11}$. Once the entire frame $F_{11}$ contains active calls, time slots from frame $F_{12}$ will be chosen from left to right, and then time slots from $F_{21}$ and then $F^{22}$.

As radiotelephone calls are dropped or handed off to adjacent cell sites, time slots from the group frames (F11, F12, F21, F22). will become free to enable additional radiotelephone call time slot assignments in a similar madder.

Additionally, the present invention provides a method of minimizing the amount of data passed between the base sites, while, at the same time, allowing each base site to more effectively scan the active communication frequencies of a particular group. As each new group (comprising at least one time partitioned frame) is established for communication use at each base site, a message is passed to the adjacent cell sites to inform them that the new group should be scan monitored. This allows the system to monitor active calls, or those calls about to become active, without requiring that all frequencies be scanned and without requiring instructions for scan monitoring to the adjacent cell sites each time a new active call is established. Similarly, as groups become unused (idle) a single message is communicated to the adjacent base sites to stop scanning the unused group.

Figure 4:
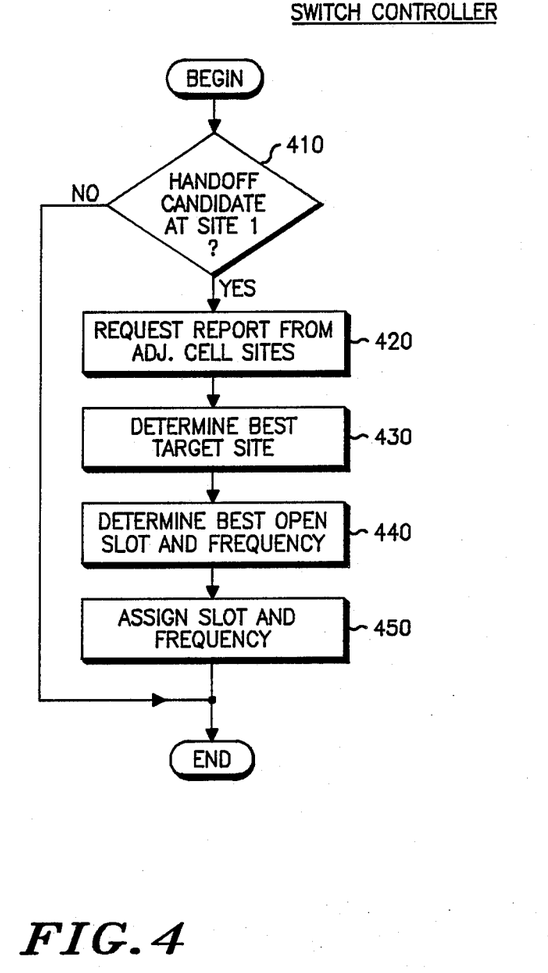
FIG. 4 is a flowchart illustrating a switch controller technique for executing time slot and frequency assignments for the scan receiver 146 or 148 of FIG. 1b, according to the present invention.

In FIG. 4, a flow chart illustrates an example of the switch controller (FIG. 1a) directing a handoff from site 1 to site 2 (referring to FIG. 1a), according to the present invention and consistent with the previous examples. The flow chart begins at block 410 where a test is performed to determine if there is a handoff candidate present at the site 1. If there is not a handoff candidate present, the procedure ends and similar tests are performed at another site.

If a handoff candidate is present at site 1, flow proceeds from block 410 to block 420 where the switch controller requests the relevant data base signal measurement information for the radiotelephone from the cell site that is adjacent the host cell site (site 2). As discussed previously (with blocks 318 and 320 of FIG. 3), each adjacent cell site can instantaneous provide a report to the switch controller on the radiotelephones communicating in adjacent cell sites. Thus, the switch controller informs site 2 of the frequency and time slot in which the radiotelephone handoff candidate is communicating (or alternatively informs site 2 of the radiotelephone's identification number depending on site 2's data base methodology).

Using the reports from each of the adjacent cell sites (site 2), at block 430 the switch controller determines the best cell site in which the radiotelephone handoff candidate should communicate next.

At block 440, the switch controller determines the first open time slot and frequency at the target site for the handoff assignment. As previously discussed, this entails filling each group frame one frame at a time, one group at a time so that the scan receiver will not be excessively burdened with changing frequencies to monitor an entire group frame serving merely one or two active calls.

At block 450, the switch controller informs the base site equipment of the assignment to effect the handoff at the target cell site.

Alternatively, since all time slot and frequency information is present at each cell site, the cell site can perform the determination indicated at block 440 and inform the switch controller of the first open time slot and frequency.

Figure 5:
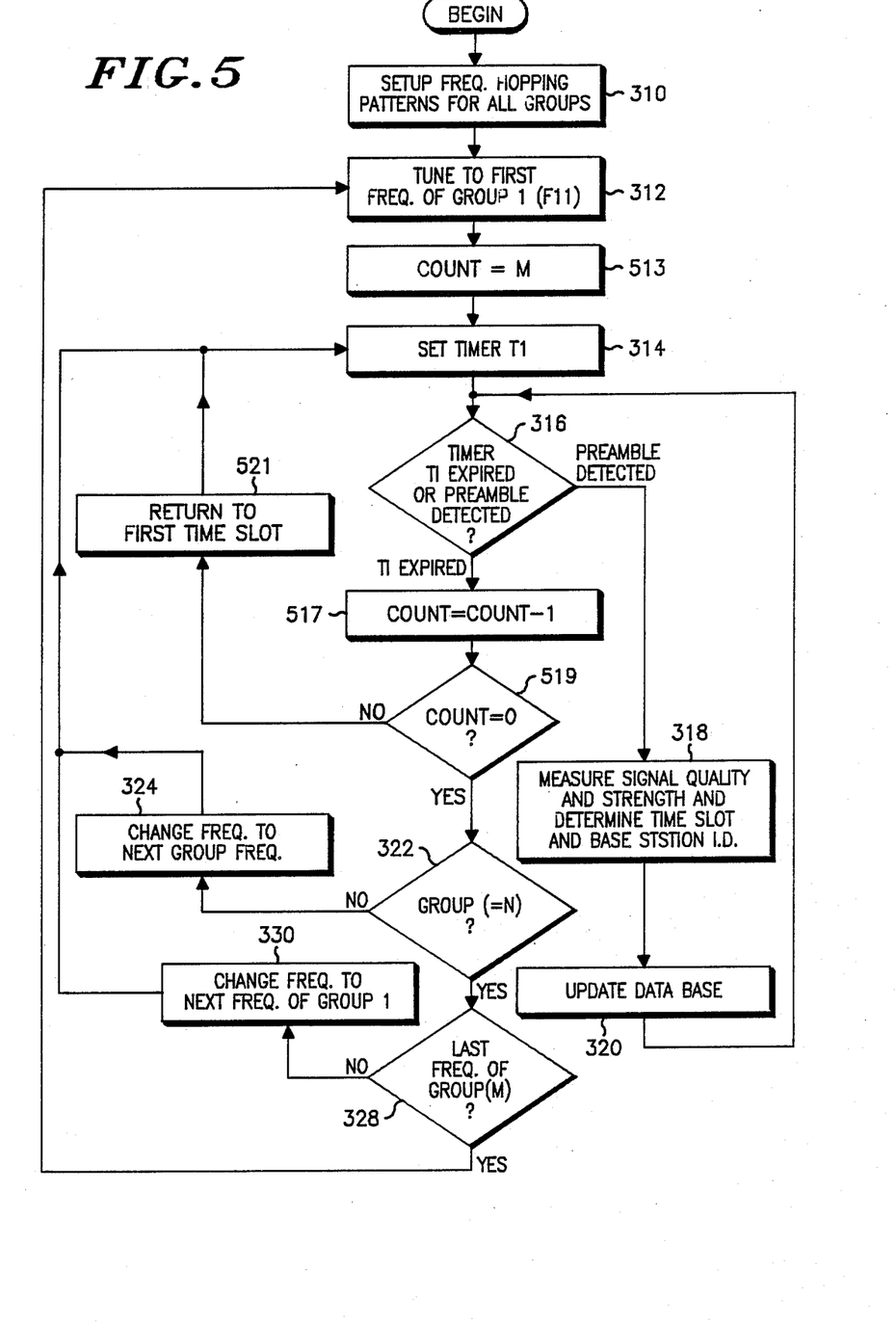
FIG. 5 is a flowchart illustrating an alternative frequency assignment for the scan receiver 146 or 148 of FIG. 1b, according to the present invention.

In yet another aspect of the present invention, usage efficiency of the scan receiver can be improved by slightly modifying the steps illustrated in FIG. 3 to delay the scan receiver within each group for M frames before the scan receiver moves to the next group. FIG. 5 is illustrative.

In FIG. 5, the flow chart of FIG. 3 is shown in modified form to include four additional steps, depicted as blocks 513, 517, 519 and 521. Once again, the flow of the steps depicted in FIG. 5 will be illustrated using FIG. 2. Once the frequency hopping patterns for all groups has been established (block 310), and the scan receiver is tuned to the first frequency ($F_{11}$) of group 1 (block 513), a counting variable "COUNT" is set equal to M, where M is the number of frequencies in each group.

From block 513 flow proceeds to block 314 where the timer is initiated, and the test to determine if the timer has expired or a preamble has been detected follows at block 316.

If the preamble is detected, flow proceeds through block 318 and block 320 to update the data base with the corresponding signal measurements.

When the timer expires, flow proceeds from block 316 to block 417 where COUNT is decremented.

At block 519, a test is performed to determine if COUNT has been decremented to zero. If COUNT has not been decremented to zero, flow proceeds from block 519 to block 521 where the microcomputer reinitializes the timer so that the scan receiver will continue to receive another eight time slots from the frame of the present frequency. This loop, established at blocks 316, 517, 519 and 521, cycles M times. For example, if M equals 3, the scan receiver will remain at the same frequency ($F_{11}$) until it receives three frames.

Once the COUNT variable has been decremented to zero, flow proceeds from block 519 to block 322 where the scan receiver frequency assignment continues as described with FIG. 3.

Delaying the scan receiver such that it continues to receive a single frequency for more than one frame can provide a significant advantage in a frequency hopping TDMA system. Referring to group 1 of FIG. 2, presuming that M equals 3 and there are eight active calls in $F_{11}$, $F_{12}$ and $F_{13}$, then after receiving three frames at frequency $F_{11}$, the scan receiver will have received transmissions from a total of 24 mobiles without having to incur a single delay. This is because its frequency was never changed. In this manner, the scan receiver receives M frames of data at $F_{11}$, then M frames of data at $F_{21}$, then M frames of data at $F_{31}$, and then returns to group 1 to receive M frames of data at $F_{12}$, then M frames of data at $F_{22}$, etc.

The scan receiver preferably rotates between frequencies of each group, rather than always monitoring the same group frequency in the rotation, so that more accurate signal measurements can be made without introducing problems such as fading at a single frequency. For example, a radiotelephone call which is active in time slot 1 of group 1 will have its transmitted signal measured three times in frequency 11, then three times in frequency 12 then three times in frequency 13 before the scan receiver returns to frequency 11 for additional measurements.

It should be pointed out that where M is large, as the scan receiver moves from one frequency hopping group to another (for example, from group 1 to group 2), a substantial number of signal measurements from active calls will be missed. In certain situations, this number may become unacceptable to overall system operation. For this type of situation, a second scan receiver, as illustrated in FIG. 1b, is employed to reduce this problem by a factor of 50%. The second scan receiver can be controlled in a manner identical to that depicted in FIG. 5, except that its individual frequency assignments follows the first scan receiver's individual frequency assignments by a time lag equal to one-half of the time it takes for a single scan receiver to cycle through each frequency, i.e., to flow from $F_{11}$, along the solid line 210 of FIG. 2 through $F_{NM}$. Additional scan receivers can be included to further reduce this problem.

It will be understood by those skilled in the art that various modifications and changes may be made to the present invention without departing from the spirit and scope thereof.

What is claimed is:

1. A time division multiple-access (TDMA) radiotelephone cellular communication system having base site equipment at at least one site with an associated radiotelephone communication coverage area and having a switch controller for connecting radiotelephone communication, and wherein the base site equipment employs a plurality of frequencies which are used for radiotelephone communication in a time partitioned manner, comprising:

monitoring means coupled with the base site equipment for monitoring a signal quality parameter of at least one radiotelephone call on the system;

processing means for maintaining a record of which frequencies and which time partitions at the base site equipment are being utilized for radiotelephone communication; and     assigning means, responsive to said processing means and said monitoring means, for assigning radiotelephone calls to time partitions of the base sit equipment frequencies based on a frequency prioritization technique that concentrates radiotelephone calls within each frequency.

2. A TDMA radiotelephone cellular communication system, according to claim 1, wherein the monitoring means includes means for monitoring the signal strength of said at least one radiotelephone call on the system.

3. A TDMA radiotelephone cellular communication system, according to claim 1, wherein the monitoring means includes means for monitoring the signal integrity of said at least one radiotelephone call on the system.

4. A TDMA radiotelephone cellular communication system, according to claim 1, wherein the monitoring means includes means for monitoring said at least one radiotelephone call in the base site equipment's coverage area.

5. A time-division-multiplex-access (TDMA) radiotelephone cellular communication system having at least first base site equipment and second base site equipment with associated radiotelephone communication coverage areas, wherein each base site equipment employs a plurality of frequencies which are used for radiotelephone communication in time partitioned frames, and wherein the system has identified a radiotelephone handoff candidate within the coverage area of the first base site equipment, comprising:

monitoring means included with the second base site equipment for monitoring frequencies from the first base site equipment to obtain signal quality parameters of radiotelephone calls, including the radiotelephone handoff candidate, active in the first base site equipment's coverage area;

processing means for maintaining a record of which frequencies and which time partitions at the second base site equipment are being utilized for radiotelephone communication; and     assigning means, responsive to said processing means and said monitoring means, for effecting a handoff to the coverage area of the second base site equipment by assigning the radiotelephone handoff candidate to a time partition in one of the second base site equipment frequencies based on a frequency prioritization technique that concentrates radiotelephone calls within each frequency.

6. A TDMA radiotelephone cellular communication system, according to claim 5, wherein said assigning means includes means for selecting a first group of frequencies which is considered for radiotelephone call assignments before other frequencies are considered for such assignments.

7. A TDMA radiotelephone cellular communication system, according to claim 6, wherein said assigning means further includes means for selecting a second group of frequencies which is considered for radiotelephone call assignments if the first group of frequencies cannot carry another radiotelephone call.

8. A TDMA radiotelephone cellular communication system, according to claim 5, wherein said monitoring means includes means for alternately monitoring a second frequency from the first base site equipment.

9. A TDMA radiotelephone cellular communication system, according to claim 8, wherein said monitoring means further includes means for monitoring each frequency for a plurality of time partitioned frames before monitoring another frequency.

10. A switch controller for use in a time-division-multiplex-access (TDMA) radiotelephone cellular communication system having a plurality of cell sites including a first cell site, wherein each cell site has associated base site equipment and corresponding radiotelephone communication coverage areas and each cell site employs a plurality of frequencies which are used for radiotelephone communication in a time partitioned manner, comprising:

(a) coupling means for communicating with the base site equipment at each of the cell sites;

(b) determination means for determining that there is a radiotelephone handoff candidate present in the first cell site coverage area;

(c) means, responsive to said determination means, for selecting a target cell site for the radiotelephone at a cell site which is adjacent to the first cell site;

(d) means for selecting a frequency and time slot from the target cell site based on a frequency prioritization technique that concentrates radiotelephone calls within each frequency; and (e) means for assigning the selected frequency and time slot to effect the handoff at the target cell site.

11. A switch controller, according to claim 10, wherein said selecting means includes means for selecting a first group of frequencies which is considered for radiotelephone call assignments before other frequencies are considered for such assignments.

12. A switch controller, according to claim 11, wherein said selecting means further includes means for selecting a second group of frequencies which is considered for radiotelephone call assignments if the first group of frequencies cannot carry another radiotelephone call.

13. A base site controller for use in a time-division-multiple-access (TDMA) cellular radiotelephone communication system having a plurality of cell sites including a first cell site, wherein each cell site has associates base site equipment and corresponding radiotelephone communication coverage areas each cell site employs a plurality of frequencies which are used for radiotelephone communication in time partitioned frames, said base site controller at each cell site comprising:

monitoring means coupled with the base site equipment for monitoring frequencies to obtain signal quality parameters of radiotelephone communications active on the system;

processing means for maintaining a record of which frequencies and which time partitions at the base site equipment are being utilized for radiotelephone communication; and     means, responsive to said processing means and to said monitoring means, for assigning radiotelephone calls to time partitions of the base site equipment frequencies based on a frequency prioritization technique that concentrates radiotelephone calls within each frequency.

14. A base site controller, according to claim 13, wherein said assigning means includes means for selecting a first group of frequencies which is considered for radiotelephone call assignments before other frequencies are considered for such assignments.

15. A base site controller, according to claim 14, wherein said assigning means further includes means for selecting a second group of frequencies which is considered for radiotelephone call assignments if the first group of frequencies cannot carry another radiotelephone call.

16. A base site controller, according to claim 14, further including means for alternately monitoring the frequencies within said first group of frequencies.

17. A base site controller, according to claim 13, wherein said monitoring means further includes means for monitoring each frequency for a plurality of time partitioned frames before monitoring another frequency.

18. A base site controller for use in a radiotelephone frequency-hopping time-division-multiplex-access (TDMA) cellular radiotelephone communication system having a plurality of cell sites including a first cell site, wherein each cell site has associated base site equipment and corresponding radiotelephone communication coverage areas and each cell site employs a plurality of frequencies which are used for radiotelephone communication in time partitioned frames, said base site controller at each cell site comprising:
   monitoring means coupled with the base site equipment for monitoring a signal quality parameter of radiotelephone communications in adjacent cell sites;
   means for storing records of which time partitions and frequencies are carrying radiotelephone communications; and
   processing means, responsive to said means for storing and coupled with said monitoring means, for programming said monitoring means to monitor selected communication frequencies in adjacent cell sites such that said monitoring means continuously monitors one of said selected frequencies for a plurality of time partitioned frames.

19. A base site controller for use in a radiotelephone frequency-hopping time-division-multiplex-access (TDMA) cellular radiotelephone communication system having a plurality of cell sites including a first cell site, wherein each cell site has associated base site equipment and corresponding radiotelephone communication coverage areas and each cell site employs a plurality of frequencies which are used for radiotelephone communication in time partitioned frames, said base site controller at each cell site comprising:
   monitoring means coupled with the base site equipment for monitoring a signal quality parameter of radiotelephone calls active on the system;
   processing means, coupled with said monitoring means, and including:
      means for programming said monitoring means to monitor selected frequencies used for carrying frequency-hopping radiotelephone calls in adjacent cell sites such that said monitoring means continuously measures said selected frequencies for a plurality of time partitioned frames, and
      means for assigning radiotelephone calls to time partitioned frames of the base site equipment frequencies in a frequency prioritized manner such that radiotelephone calls are concentrated within each frequency.

20. A time-division-multiple-access (TDMA) radiotelephone cellular communication system having base site equipment at at least one site with an associated radiotelephone communication coverage area and having a switch controller for connecting radiotelephone communication, and wherein the base site equipment employs a plurality of frequencies which are used for radiotelephone communication in a time partitioned manner, comprising:
   monitoring means coupled with the base site equipment for monitoring a signal quality parameter of at least one radiotelephone call on the system;
   processing means for maintaining a record of which frequencies and which time partitions at the base site equipment are being utilized for radiotelephone communication;
   means, responsive to said processing means and said monitoring means, for instructing base site equipment to begin monitoring frequencies as they become used for radiotelephone calls.

21. A TDMA radiotelephone cellular communication system, according to claim 20, further including means, responsive to said processing means and said monitoring means, for instructing base site equipment to stop monitoring frequencies as they become idle.

* * * * *

UNITED STATES PATENT AND TRADEMARK OFFICE
CERTIFICATE OF CORRECTION

PATENT NO. : 4,866,710

DATED : 9/12/89

INVENTOR(S) : Schaeffer, Dennis R.

It is certified that error appears in the above-identified patent and that said Letters Patent is hereby corrected as shown below:

Col. 2, line 20, "sites's" should be --site's--.

Col. 2, line 40, "is diagram" should be --is a diagram--.

Col. 3, lines 28 & 29, "transmitter- combiner" should be --transmitter-combiner--.

Col. 5, line 13, "e.g.," should be --E.g.,--.

Col. 6, line 50, "$F^{22}$" should be --$F_{22}$--.

Col. 6, line 53, "F22)." should be --F22)--.

Col. 6, line 55, "madder" should be --manner--.

Col. 7, line 21, "instantaneous" should be --instantaneously--.

Col. 7, line 60, "has" should be --have--.

Col. 9, line 17, "sit" should be --site--.

Col. 9, line 35, "time-division-multiplex-access" should be --time-division-multiple-access--.

Col. 10, lines 16 & 17 "time-division-multiplex-access" should be --time-division-multiple-access--.

Col. 10, line 53, "associates" should be --associated--.

Col. 11, line 25, "time-division-multiplex-access" should be --time-division-multiple-access--.

UNITED STATES PATENT AND TRADEMARK OFFICE
CERTIFICATE OF CORRECTION

PATENT NO. : 4,866,710

DATED : 9/12/89

INVENTOR(S) : Schaeffer, Dennis R.

It is certified that error appears in the above-identified patent and that said Letters Patent is hereby corrected as shown below:

Col. 11, line 49, "time-division-multiplex-access" should be --time-division-multiple-access--.

Signed and Sealed this

Sixteenth Day of April, 1991

Attest:

HARRY F. MANBECK, JR.

Attesting Officer

Commissioner of Patents and Trademarks